Dec. 8, 1970 C. L. JACOBSON 3,546,486

LIMITER CIRCUIT

Filed Dec. 15, 1967 2 Sheets-Sheet 1

INVENTOR.
CHARLES L. JACOBSON
BY Ronald Zibelli
Franklyn C. Weiss
ATTORNEYS

INVENTOR.
CHARLES L. JACOBSON
BY Ronald Zibelli
Franklyn C. Weiss
ATTORNEYS

United States Patent Office 3,546,486
Patented Dec. 8, 1970

3,546,486

LIMITER CIRCUIT

Charles L. Jacobson, Pittsford, N.Y., assignor to Xerox Corporation, Rochester, N.Y., a corporation of New York Filed Dec. 15, 1967, Ser. No. 690,990
Int. Cl. H03b 3/02
U.S. Cl. 307—264 5 Claims

ABSTRACT OF THE DISCLOSURE

A limiter circuit for use in amplitude limiting frequency modulating signals. In conjunction with a high speed differential comparator, a rectangular shaped pulse the width of the positive half cycles of the incoming frequency modulated signal is generated. Noise is therefore effectively suppressed while preserving the frequency modulated signal transitions.

BACKGROUND

In the frequency modulating technique known as frequency shift keying, data transmission is accomplished by assigning a carrier frequency to each state of the data, i.e., mark and space, and transmitting the appropriate frequency for a period of time sufficient to assure reliable detection. The technique may be extended to include frequency transmission of data information with more than the normal two level mark and space frequencies. That is, in a multi-level data transmission system employing frequency shift keying, a plurality of frequencies would be transmitted, one frequency for each level in the data waveform.

Transmission of the frequency modulated or frequency shift keyed signal in a facsimile or other type of system, for example, may be accomplished over any of the known transmission media, such as standard commercial telephone lines, microwave installations, and direct wire. At a receiving location, the frequency modulated signals must be demodulated and detected in order to obtain the original transmitted inforamtion. If the transmitted information is in the form of frequency shift modulated waves, prior art techniques of demodulation are to employ the well known ratio detector or discriminator circuit. Another well known prior art technique is to detect the zero crossings of the long term average value of the incoming frequency modulated signals. Upon detection of the zero crossings, signals can be generated in response thereto and passed through a low pass filter which effectively takes the short term average value of the pulses. This average signal can then be decoded to recover the information in the signal waveform.

While an FM signal is transmitted without amplitude modulation, transmission line characteristics, extraneous noise, and other transients on the line introduce some amplitude variations into the FM signal. In order to present pure FM signals to the demodulating and subsequent circuitry as discussed above, such amplitude variations must be eliminated in order that the detector respond only to the frequency variations in the incoming signal.

OBJECTS

It is, accordingly, an object of the present invention to provide an improved frequency modulated signal demodulator.

It is another object of the present invention to increase the efficiency of a data transmission system utilizing frequency shift keying.

It is another object of the present invention to improve the demodulation of frequency shift keyed signals in the presence of distortion.

It is another object of the present invention to effectively eliminate amplitude variations from a received frequency modulated signal.

It is another object of the present invention to provide an improved limiter circuit to remove both short and long term amplitude variations from a received frequency modulated signal.

BRIEF SUMMARY OF THE INVENTION

In acomplishing the above and other desired aspects, applicant has invented new and improved apparatus for removing both short and long term amplitude variations from a received frequency modulation signal in order that the FM detector can respond only to frequency variations. The invention utilizes a high speed differential linear comparator circuit for generating rectangular shaped pulses, the width of which equals the positive half cyles of the incoming frequency modulated signals. Thus, when a frequency modulated signal is received, regardless of the amplitude variations introduced into the signal, the limiter circuit responds only to the transition of the signal as it crosses the zero amplitude axis in a positive direction and when the frequency modulated signal returns to the zero amplitude signal in a negative-going direction. The output from the limiter is a rectangular shaped pulse train with the zero crossing axis defined as the long term average value of the signal maintained while noise immunity is interposed.

DESCRIPTION OF THE DRAWINGS

For a more complete understanding of the invention, as well as other objects and further features thereof, reference may be had to the following detailed description in conjunction with the drawings wherein.

DETAILED DESCRIPTION OF THE INVENTION

Figure 1:
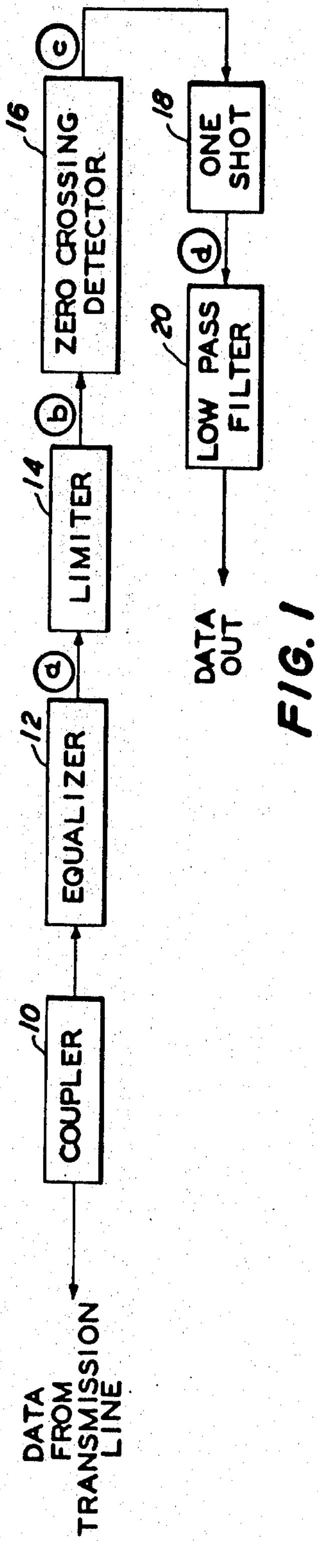
FIG. 1 is a block diagram of a demodulator including the present invention limiter ciruit.

Referring now to FIG. 1, there is shown a block diagram of a demodulator ciruit for the frequency modulated signals as received from a transmission media, of any known type. As the output end of the transmission media would be any prior art coupling apparatus 10 to couple the transmission line to the demodulating apparatus. Such a coupler could be a direct electronic coupler, or may be of the acoustic coupling type whereby the transmitted information is acoustically detected, as via a telephone receiver on the end of a commercial telephone network, for example.

From the coupler 10 the signals are then passed to an equalizer circuit 12 to provide equalization for the specific characteristics of the transmission media. Such an equalizer circuit may be of any of the known types, such as for frequency attenuation and/or phase distortion. The output from the equalizer 12 would then be a signal seen in FIG. 2*a* which, for purposes of example, comprises a frequency shift keyed signal of four frequencies, *f*1, *f*2, *f*3, and *f*4. The signals from the equalizer are then passed to the limiter 14, hereinafter more fully described, to limit and amplify the input signals to generate an essentially rectangular pattern where the rise time is not a function of the amplitude of said input signals fed thereto to produce a waveform seen in FIG. 2*b*.

The zero crossing detector 16, of any conventional design, generates pulses, FIG. 2*c*, in accordance with the zero crossings determined from FIGS. 2*a* and 2*b*. The one shot multivibrator 18 receives the waveform in FIG. 2*c* and generates the output pulse train seen in FIG. 2*d*.

Low pass filter 20 receives the pulse waveform from one shot multivibrator 18 and produces the familiar eye pattern in the form of demodulated information in accordance with the input pulse train in FIG. 2*d* which can be subsequently decoded to recover the transmitted information.

FIG. 2*d* shows the generated pulses to be in the form of constant width pulses generated in response to the zero crossings of the long term average value of the input pulse train seen in FIG. 2*a*. The fact that these pulses occur upon detection of the zero crossings of the input information would allow the low pass filter 20 to determine the average value of such pulses which, as previously mentioned, can be utilized to recover the transmitted information in a subsequent decoder. The pulses could be, in addition, of variable width and still utilize the low pass filter.

The heart of the present invention is the use of the differential amplifier to generate the rectangular pulses from the input frequency modulated signals. A primary function of a differential amplifier is the amplification of differential mode input voltages and the supression of interfering common mode input signals. In the differential mode, two unlike signals applied to the double ended input result in an output proportional to their difference; in common mode, like signals result in a negligible output. In practical terms, the circuit selects, compares, and amplifies low level signals in noisy environments.

A differential voltage comparator is a high gain, differential input, single ended output amplifier. The function of the device is to compare a signal voltage on one input with a reference voltage on the other and produce a digital one or zero at the output when one input is higher than the other.

The ideal differential comparator would have infinite voltage gain, input impedance, and frequency response, and no output impedance or noise. There would be no output voltage when there was no input voltage, and input and output voltage ranges would be unrestricted. As in most physical apparatus, the ideal is not reached, but the departure therefrom is predicted and compensation can be accomplished.

One of the most significant differential comparator characteristics, for example, is input offset voltage. Without compensation, such input offset voltage can be a source of errors in the output signal and a factor in limiting the output signal swing. A compensating bias potential can be applied to the standard level or "non-inverting input" and overcome the input offset voltage characteristics.

An FM detector is usually amplitude sensitive to some degree. The main function of the limiter, of the present invention, is to remove both short and long term amplitude variations from the received signal so that the detector can respond only to frequency variations. The limiter effectively passes only a narrow amplitude slice of the received signal centered about zero amplitude, thus preserving the zero crossing information.

In the design of a limiter, it is important to insure that the limiter limits about a zero amplitude or else carrier leak will result in the output. In addition, the limiter must also have a dynamic range which can accommodate the expected loss and loss variations in the transmission medium. With these points in mind, the circuit shown in FIG. 3 was developed as a limiter circuit. The basic limiting device is a differential comparator circuit. One such circuit which can be utilized is a Fairchild uA710C differential comparator integrated circuit. Such a differential comparator circuit can be purchased from Fairchild Semiconductor Company in Mountainview, Calif.

Figure 3:
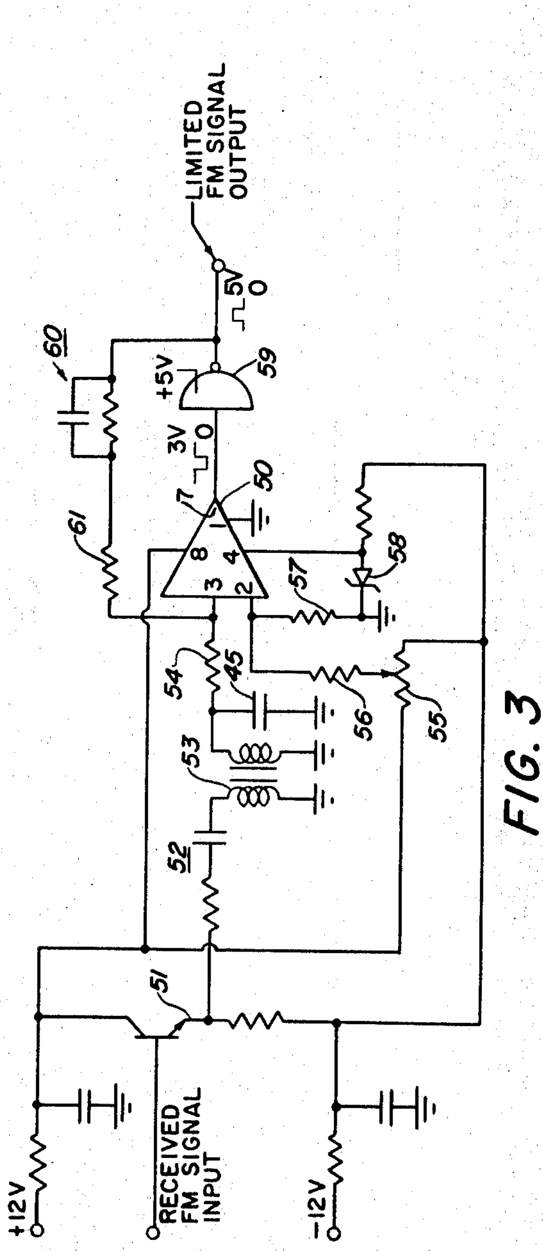
FIG. 3 is a schematic diagram of the limiter ciruit shown in FIG. 1.

This differential comparator has a very fast response time and is capable of operating with a low hysteresis. In FIG. 3 can be seen the differential comparator of the present invention utilized in a limiter circuit. Supply voltages applied to this differential comparator 50 are +12 volts to terminal 8 and, by means of Zener diode 58, −5.1 volts to terminal 4. The output can be seen from terminal 7, while terminal 1 is at ground potential. The received FM signal is applied to transistor 51 which is connected as an emitter follower. The emitter follower stage is utilized for impedance matching from the equalizer to the limiter. The output from transistor 51 is coupled to transformer 53 through an RC network 52. The transformer is utilized to present a low input impedance to ground in order that good temperature operation be obtained. From the secondary of transformer 53, the frequency modulated input signal is applied through resistor 54 to the "inverting" input at terminal 3. Capacitor 45 is utilized to reduce any high frequency harmonics or noise that may have been generated in the input frequency modulated signal during transmission.

The reference voltage to which the frequency modulated signal is applied is presented to terminal 2 of differential comparator 50. The potentiometer 55 is used to adjust the reference level so that the limiter limits around a zero amplitude level. Resistor 57 applies the standard reference voltage while resistors 55 and 56 are used, as set forth above, to adjust the reference level around the zero amplitude level to compensate for the input offset voltage of the differential comparator.

The output from terminal 7 of comparator 50 is applied to inverter 59 which inverts and shifts the potential of the output limited FM signal. This output is also applied back to the inverting input of the comparator 50 through RC network 60 and resistor 61. Inasmuch as the signal has been inverted by the differential comparator 50 and inverter 59, the feedback network operates in a positive feedback fashion. Since the output from inverter 59 is a rectangular shaped signal as shown, while the input to terminal 3 of comparator 50 is a sine wave type of signal, the effect of the positive feedback will be to reduce any oscillation and hysteresis which may occur in comparator 50.

Figure 2:
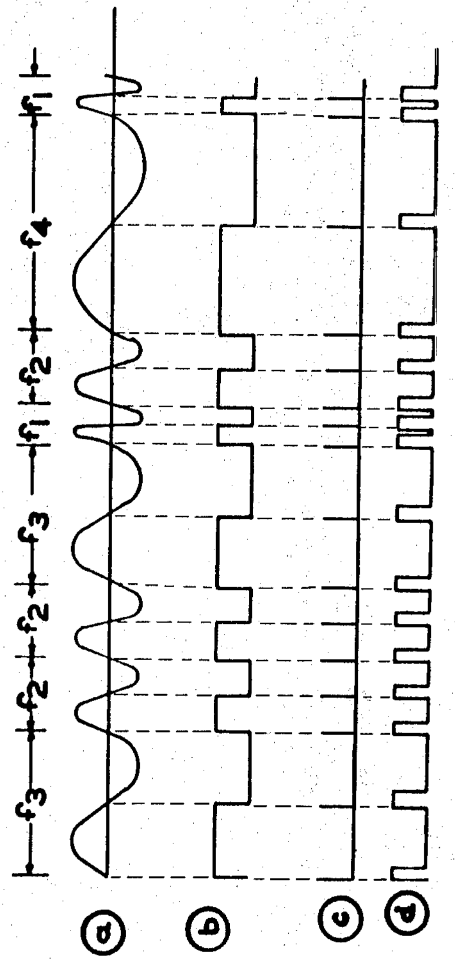
FIG. 2 shows various waveforms helpful in understanding the block diagram of FIG. 1.

Referring back to FIG. 2, the operation of the limiter circuit can be seen more fully. In FIG. 2*a* is the frequency modulated signal as applied to limiter 14. If FIG. 2*b* is assumed to be the signal train at the output of inverter 59, it can be seen that the positive transitions of the frequency modulated signal in FIG. 2*a* result in the rectangular waveform seen in FIG. 2*b*. Thus, as the input signal rises above the long term zero voltage axis, on terminal 3 of comparator 50, the comparator denotes the change in the input signal due to the sine wave input on terminal 3 and reference voltage on terminal 2, and delivers a rectangular pulse as long as the input frequency modulated signal remains above the zero long term axis. When the FM signal returns below the long term axis, the output of the comparator will return to the zero voltage state. When the input FM signal rises again above the long term zero axis, the differential action of the comparator 50 again generates the rectangular voltage at the output until the input frequency drops below the long term axis again. What is gained, therefore, is a rectangular waveform seen in FIG. 2*b* which can be applied to the zero crossing detector 16 as seen and described in conjunction with FIG. 1. Subsequent demodulation action can be performed as described therein. This waveform seen in FIG. 2*b*, is, therefore, a signal representative of the input frequency modulated signals, retaining the necessary zero axis crossings, while eliminating the effects of amplitude distortion on the received signal.

In the foregoing, there has been disclosed apparatus for effectively eliminating amplitude distortion on a received frequency modulated signal. The circuitry was described in conjunction with a four level signal; but it is obvious, however, that such four data levels are exemplary only, as any number of levels could be demodulated in a similar manner in accordance with the principles of the present invention. The circuit has utility in any frequency modulated data transmission system. Facsimile transmission systems, for example, utilizing the frequency modulation technique would advantageously use the disclosed invention in the demodulation of the transmitted information. Therefore, while the invention has been described with reference to specific embodiments, it will be understood by those skilled in the art that various changes may be made and equivalents may be substituted for elements thereof without departing from the true spirit and scope of the invention. In addition, many modifications may be made to adapt a particular situation to the teaching of the invention without departing from the essential teachings thereof.

What is claimed is:

1. A circuit for eliminating the effect of long and short term amplitude variations in a frequency modulated signal comprising
   a differential comparator circuit with a reference voltage input and a signal voltage input,
   means for applying said frequency modulated signals to said signal voltage input,
   means coupled to said reference voltage input to establish a reference voltage, said means to establish a reference voltage including means for adjusting said reference voltage in order that said differential comparator compares the reference voltage at the zero amplitude level of said frequency modulated signal,
   means for inverting the ouptut signal of said differential comparator, and
   means for coupling said inverted output signals to said signal voltage input to eliminate oscillation and reduce hysteresis by said differential comparator,
   wherein the output signals from said differential comparator circuit are signals of finite time duration, each equal to the respective positive durations of the frequency modulated signal.

2. The circuit as set forth in claim 1 wherein said means for applying comprises
   transistor means for receiving said frequency modulating signal and establishing proper circuit impedance matching,
   transformer means coupled to said transistor means for providing a low input impedance to ground for said differential comparator circuits, and
   capacitor means coupled to the output of said transformer means for filtering out any high frequency harmonic signals in said frequency modulated signal.

3. A limiter circuit for generating rectangular shaped finite time duration signals in response to the time duration of respective half cycles of a frequency modulated signal, thereby eliminating the effects of amplitude noise variations therein, comprising
   means for receiving said frequency modulated signals and establishing the required input impedance for the circuit,
   capacitor means coupled to the receiving means for filtering out any high frequency harmonic signals in said frequency modulated signal,
   a differential comparator circuit with a reference voltage input and a signal input, said signal input coupled to said capacitor means,
   means for providing a reference voltage coupled to the reference voltage input,
   means for adjusting said reference voltage to allow said differential comparator to compare said reference voltage about the zero amplitude level of said frequency modulated signal, and
   positive feedback means coupled from the output to the signal input of said differential comparator to eliminate oscillation and reduce hysteresis by said differential comparator.

4. The system as set forth in claim 3 wherein said receiving means comprises
   transistor means for establishing the circuit impedance matching, and
   transformer means coupled to said transistor means for providing a low input impedance to ground potential for said differential comparator.

5. The system as set forth in claim 4 wherein said positive feedback means comprises
   means for inverting the output signal from said differential comparator, and
   means for coupling said inverted output signal to said signal input of said differential comparator.

References Cited

UNITED STATES PATENTS

| | | | |
|---|---|---|---|
| 2,005,111 | 6/1935 | Shore | 328—164X |
| 3,149,288 | 9/1964 | Rhodes | 328—169 |
| 3,204,124 | 8/1965 | Durio | 328—140X |
| 3,327,230 | 6/1967 | Konian | 328—117X |

STANLEY T. KRAWCZEWICZ, Primary Examiner

U.S. Cl. X.R.

307—233, 237, 265; 328—164, 169, 173, 175; 329—134